United States Patent
Ozawa

(10) Patent No.: US 8,199,288 B2
(45) Date of Patent: *Jun. 12, 2012

(54) LIQUID CRYSTAL DEVICE, PROJECTION APPARATUS, AND ELECTRONIC APPARATUS

(75) Inventor: Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,596

(22) Filed: Dec. 21, 2010

(65) Prior Publication Data

US 2011/0090432 A1    Apr. 21, 2011

Related U.S. Application Data

(63) Continuation of application No. 11/356,127, filed on Feb. 17, 2006, now Pat. No. 7,880,838.

(30) Foreign Application Priority Data

Mar. 11, 2005    (JP) ................... 2005-068700

(51) Int. Cl.
*G02F 1/1335* (2006.01)
(52) U.S. Cl. .................. 349/117; 349/118; 349/119
(58) Field of Classification Search .................. None
See application file for complete search history.

(56) References Cited

U.S. PATENT DOCUMENTS

| | | | |
|---|---|---|---|
| 5,667,854 A | 9/1997 | Yamada | |
| 6,281,956 B1 | 8/2001 | Ohmuro et al. | |
| 6,536,901 B2 | 3/2003 | Takezawa et al. | |
| 6,577,375 B1 | 6/2003 | Umehara et al. | |
| 6,642,981 B1 * | 11/2003 | Ohmuro et al. | 349/120 |
| 6,642,989 B2 | 11/2003 | Umehara et al. | |
| 6,702,443 B2 | 3/2004 | Takezawa et al. | |
| 6,717,642 B2 | 4/2004 | Sasaki et al. | |
| 6,816,218 B1 | 11/2004 | Coates et al. | |
| 6,885,423 B2 | 4/2005 | Shuto et al. | |
| 7,075,609 B2 | 7/2006 | Ohmuro et al. | |
| 7,170,575 B2 | 1/2007 | Coates et al. | |
| 7,401,926 B2 | 7/2008 | Kamijima et al. | |
| 7,880,838 B2 * | 2/2011 | Ozawa | 349/117 |
| 2002/0054260 A1 | 5/2002 | Maeda et al. | |
| 2004/0196417 A1 | 10/2004 | Okazaki et al. | |
| 2006/0109404 A1 | 5/2006 | Maeda | |

(Continued)

FOREIGN PATENT DOCUMENTS

CN    1412582 A    4/2003

(Continued)

*Primary Examiner* — Thanh-Nhah P. Nguyen
(74) *Attorney, Agent, or Firm* — Oliff & Berridge, PLC

(57) ABSTRACT

A projection display includes a light source, a liquid crystal panel encapsulating a vertical alignment mode liquid crystal between a first substrate and a second substrate which are opposite to each other, the liquid crystal panel modulating light emitted from the light source, a longer axis of a molecule of the vertical alignment mode liquid crystal tilted from the normal direction of the first substrate, a projection lens projecting light modulated by the liquid crystal panel, a first polarization plate placed on an optical path from the light source to the liquid crystal panel, a second polarization plate placed on an optical path from the liquid crystal panel to the projection lens, an optical-compensation plate placed between the liquid crystal panel and the second polarization plate, and the optical-compensation plate including a plate-like base and a retardation plate formed on a surface of the plate-like base.

4 Claims, 4 Drawing Sheets

U.S. PATENT DOCUMENTS

2006/0203150 A1 9/2006 Ohmuro et al.
2007/0040970 A1 2/2007 Yoshioka et al.

FOREIGN PATENT DOCUMENTS

| JP | A-09-230143 | 9/1997 |
|----|----|----|
| JP | B2-11-052361 | 2/1999 |
| JP | A-11-337919 | 12/1999 |
| JP | A-2000-131693 | 5/2000 |
| JP | A-2000-314809 | 11/2000 |
| JP | A-2001-272671 | 10/2001 |
| JP | A-2002-357789 | 12/2002 |
| JP | A-2003-227938 | 8/2003 |
| JP | A-2003-322853 | 11/2003 |
| JP | A-2004-020993 | 1/2004 |
| JP | A-2004-245914 | 9/2004 |
| JP | A-2004-246178 | 9/2004 |
| JP | A-2005-37809 | 2/2005 |
| JP | A-2005-43740 | 2/2005 |

* cited by examiner

LIQUID CRYSTAL DEVICE, PROJECTION APPARATUS, AND ELECTRONIC APPARATUS

BACKGROUND OF THE INVENTION

This is a Continuation of application Ser. No. 11/356,127 filed Feb. 17, 2006. The disclosure of the prior applications is hereby incorporated by reference herein in its entirety.

TECHNICAL FIELD

The present invention relates to a technology of displaying an image by controlling a liquid crystal alignment.

RELATED ART

A vertical alignment (VA)—mode liquid crystal panel was conventionally suggested in that molecules of a liquid crystal are aligned along with the vertical direction against a substrate when no voltage is applied to a liquid crystal (the non-voltage state.) JA11-52361 (a paragraph 0012) is an example of the related art. This type of a liquid crystal can improve the contrast ratio of an image, being preferable for a projection apparatus (a projector) in which a high contrast ratio is required.

Here, in this vertical alignment (VA)—mode liquid crystal panel, it is preferable to perfectly align liquid crystal molecules against a substrate at the time of the non-voltage state, only viewing from the improvement of the contrast ratio. When liquid crystal molecules are vertically aligned against a substrate, however, it become difficult to quantitatively control a behavior of each of molecules, in particular, the direction of changing the alignment, after voltage is applied to them. This difficulty results in a problem of yielding the discrenation caused by derangement of the alignment of molecules.

In order to overcome the problem, it was considered that liquid crystal molecules are aligned toward a direction, which is slightly tilted from the direction vertical toward a substrate at the time of a the non-voltage state. However, in this alignment, the remarkable birefringence of a liquid crystal at the non-voltage state may offset an advantage of the high contrast ratio of the VA mode.

SUMMARY

In view of the above issue, the advantage of the present invention is to provide a VA mode liquid crystal device improving the contrast ratio of a display image with controlling the discrenation.

In one aspect of the invention, a projection apparatus comprises a light source, a liquid crystal device, which modulates light emitted from the light source and a projection lens, which projects the modulated light. The liquid crystal device comprises: a liquid crystal panel encapsulating a vertical alignment mode liquid crystal between a pair of substrates which are oppositely placed each other; a first polarization plate placed on an optical path from the light source to the liquid crystal panel; a second polarization plate placed on an optical path from the light source to the projection lens; and an optical-compensation plate placed between the liquid crystal panel and the first polarization plate or the second polarization plate. The optical-compensation plate includes a plate-like base, in which the direction of a first main refractive index (nx0 for example) intersects with the direction of a second main refractive index (ny0, for example) within a plane, which is in parallel with the liquid crystal panel, the value of the first main refractive index is different from the value of the second main refractive index and a third main refractive index (nz0) of which direction is vertical to the liquid crystal panel, is smaller than the first and second main refractive indexes; and retardation plate in which each of major refractive indexes (nx1 and ny1 for example) intersecting each other within a plane, which is in parallel with the liquid crystal panel, is different from other indexes. Further, the optical-compensation plate is a plate-like member where a refractive index (nz for example) of which direction is vertical to the liquid crystal panel, is smaller than a refractive index (nx or ny for example) in plane that is in parallel with the liquid crystal panel. Here, the main refractive index means a refractive index to the directions of a major axis and a minor axis in an ellipsoidal refractive index of a birefringence element with one axis or two axes.

This optical-compensation plate comprises a multi-layered retardation plate having al least one-axis refractivity on the surface of a substrate having two-axes refractivity. The optical-compensation plate has a structure in which a refractive index having the direction of which is vertical to a liquid crystal panel is smaller than a refractive index having the direction that is parallel to a liquid crystal panel as a whole. According to this structure, even when liquid crystal molecules are aligned toward a direction, which is slightly tilted from the direction vertical toward a substrate at the time of a the non-voltage state to avoid the discrenation, the birefringence of a liquid crystal due to this tilt can be effectively compensated (cancelled) by the optical-compensation plate. Therefore, the invention can constrain the discrenation without decreasing an advantage of the high contrast ratio in the VA mode. Further, the retardation plate is formed on the plate-like base, enhancing the mechanical strength of the retardation plate and constraining the deformation of the film.

In other aspect of the invention, the optical-compensation plate is placed between the first polarization plate and the liquid crystal plate so that the plate-like base is placed on the opposite side of the liquid crystal panel with encapsulating the retardation plate. A delay axis (the first axis P shown in FIG. 5, for example) of the plate-like base within a plane which is in parallel with the liquid crystal panel is in parallel with or vertical to the transparent axis of the first polarization plate (see FIG. 2.) In a structure using the plate like base where major refractive indexes are different each other in a plane of the liquid crystal panel according to the invention, if the delay axis (or the fast axis) of the plate-like base and the transparent axis (or the absorption axis) of the first polarization plate are tilted, it is necessary to arrange the optical characteristics of both the plate-like base and the retardation plate in order to offset birefringence within the surface of the liquid crystal panel with the birefringence within the plate-like base and the retardation plate. On the other hand, according to the aspect of the invention, the delay axis of the plate-like base, in a plane, which is parallel with the liquid crystal panel, is vertical or parallel to the transparent axis of the first polarization plate. Light (linearly polarized) emitted from the first polarization plate passes through the base and reaches the retardation plate without the birefringence of a liquid crystal with respect to the direction t which is in parallel with the liquid crystal panel, thereby. Therefore, according to the aspect of the invention, it is possible to offset birefringence within a plane of the liquid crystal panel only by appropriately arranging refractive index in a direction of a plane of the retardation plate (namely without considering the optical characteristics of the base.)

According to a projection apparatus of the invention, a lens may be placed on the light path from the light source to the liquid crystal of the liquid crystal panel and may condense light inputting to the liquid crystal. In this structure, light inputting to the liquid crystal panel can be concentrated into a liquid crystal, improving the efficiency of using light comparing to a case without this kind of lens. Here, light passed the lens receives the effect of the optical characteristics of the lens. Hence, if the optical-compensation plate is placed near the light source far from the lens, it is possible not to sufficiently offset the birefringence of a liquid crystal as the result of passing thorough a lens and making light characteristics change, even the optical-compensation plate is provided for offsetting the birefringence of a liquid crystal. Hence, in this structure provided with the lens, it is preferable that the optical-compensation plate is placed between the second polarization plate and the liquid crystal panel, and a delay axis of the plate-like base within a plane which is in parallel with the liquid crystal panel is in parallel with or vertical to the transparent axis of the second polarization plate. This structure can further certainly offset the birefringence of a liquid crystal. Further, in the structure where the optical-compensation plate is placed so that the plate-like base is placed on the opposite side of the liquid crystal panel with encapsulating the retardation plate, it is possible to offset it is possible to offset birefringence within a plane of the liquid crystal panel only by appropriately arranging the refractive index in a direction of a plane of the retardation plate (namely without considering the optical characteristics of the base.)

In a projection apparatus, an amount and intensity of light irradiating the liquid crystal panel is larger than that of a display where a viewer directly watches the surface of liquid crystal panel, since light emitted from a projection lens is projected to a screen located far from the display. Hence, it is easy to generate heat in each of elements located near the liquid crystal panel thereby. Hence, it is possible to thermally deflect the retardation plate, changing the optical characteristics of it from the initial state. In order to overcome the issue, according to the aspect of the invention, the plate-like base of the optical-compensation plate may be made of a material of which thermal conductivity is higher than that of the retardation plate. According to this structure, the base having high thermal conductivity functions as a heat sink emitting heat from the retardation plate. Thus it is possible to maintain the initial optical characteristics of the retardation plate even when heat is generated in each element by light irradiation to a liquid crystal device. A typical example of material having high thermal conductivity is sapphire.

In other aspect of the invention, the liquid crystal panel is provided with a alignment film which make molecules of the liquid crystal align in the direction of which longer axis is tilted toward the normal direction of the substrate and the alignment film is placed on the surface of the substrate. The angle θ between the direction of the fast or slow axis within a plane of the retardation plate and the direction of a longer axis in which the molecules of the liquid crystal are normally projected to the surface of the substrate, satisfies the following relation; $40° \leq θ \leq 50°$. According to this aspect of the invention, it is possible to preciously offset the birefringence of the liquid crystal panel by the optical-compensation plate. Here, an alignment film made by an organic material such as polyimide has a property of easy deformation by adding heat comparing to an alignment film made by an inorganic material. In order to avoid this property change, an alignment film made by an inorganic material such as $SiO_x$ is formed in the structure, which easily receives heat such as a projection apparatus. This alignment film is formed by evaporating an inorganic material on the surface of a substrate from the direction, which has a predetermined angle toward the vertical line of the substrate of liquid crystal panel.

According to further aspect of the invention, the maximum value nx of the refractive index of the optical-compensation plate within a plane which is in parallel with the liquid crystal panel, the refractive index ny, of which direction is orthogonal to the direction of the maximum value nx, and the thickness d0(nm) of the optical-compensation plate satisfy the following relationship; $20 (nm) < (nx-ny) \times d0 < 180 (nm)$. This aspect effectively compensates the birefringence of a liquid crystal and displays an image with a high contrast ratio over a wide viewing angle. Further, in the other aspect of the invention, the retardation Δnd of the liquid crystal, the maximum value nx of the refractive index of the optical-compensation plate within a plane which is in parallel with the liquid crystal panel, the refractive index ny, of which direction is orthogonal to the direction of the maximum value nx, the refractive index nz of the optical-compensation plate within a plane of which direction is vertical to the liquid crystal panel, and the thickness d0 of the optical-compensation plate satisfy the following relationship; $Δnd \times 0.3 < [(nx+ny)/2-nz] < Δnd \times 0.8$ This aspect can realize a high contrast ratio over a wide viewing angle.

Further, in the other aspect of the invention, the liquid crystal device comprises: a first polarization plate; a second polarization plate placed oppositely toward the first polarization plate, a liquid crystal panel located between the first and second polarization plates and encapsulating a vertical-alignment liquid crystal between a pair of substrates which are oppositely placed each other; and an optical-compensation plate placed between the liquid crystal panel and the first polarization plate or the second polarization plate. The optical-compensation plate includes a plate like substrate and a retardation plate. In the plate like substrate, the direction of a first refractive index intersects with the direction of a second refractive index within a plane, which is in parallel with the liquid crystal panel, the value of the first refractive index is different from the value of the second refractive index and a third index of which direction is vertical to the liquid crystal panel, is smaller than the first and second refractive indexes; and a retardation plate in which each of major refractive indexes intersecting each other within a plane, which is in parallel with the liquid crystal panel, is different from other indexes. Further, the optical-compensation plate is a plate-like member where a refractive index of which direction is vertical to the liquid crystal panel, is smaller than a refractive index in plane that is in parallel with the liquid crystal panel. This aspect can reduce the discrenation by the same function of a projection apparatus of the invention without decreasing an advantage of a high contrast of the VA mode. Further, it is preferable that a liquid crystal device of the invention is also applied to a display that a viewer directly watches more than a projector. Electronic apparatus relating to the invention can be applied to various electronic instruments such as a mobile phone and a personal computer.

BRIEF DESCRIPTION OF THE DRAWINGS

The invention will be described with reference to the accompanying drawings, wherein like numbers refer to like elements, and wherein.

DESCRIPTION OF THE EMBODIMENTS

The Structure of a Projection Apparatus

Figure 1:
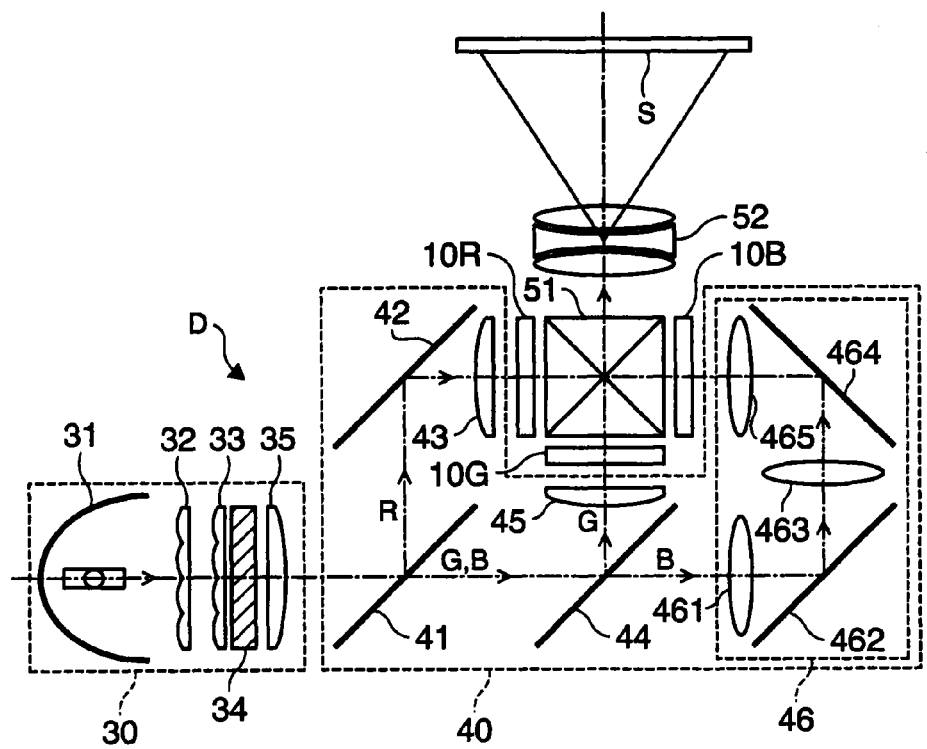
FIG. 1 is a schematic showing a projection apparatus according to a first embodiment of the invention.

FIG. 1 is a schematic showing a projection apparatus according to a first embodiment of the invention. As shown in the figure, a projection apparatus D comprises three liquid crystal devices 10(10R, 10G and 10B) corresponding to each color of red(R), green (G) and blue(B), a light irradiation system 30 emitting light, a light separation system 40 which separates emitted light into each color of red, green and blue and introduce them to the liquid crystal device 10, a diachronic prism 51, which integrates light emitted from each of the liquid crystal device 10, a projection lens 52, which projects the emitted light from the diachronic prism 51.

The light irradiation system 30 includes a light source 31 such as a halogen lump emitting white light. The light emitted from the light source 31 passes through a first lens array 32 and a second lens array 32, in which a plurality of lenses are arranged in a plane, and is converted to a plurality of light bundles, reaching a polarized-light generator 34. The polarized-light generator 34 is a plate-like member, which converts emitted light into any of S polarized light and P polarized light and emits it. The polarized light emitted from the polarized-light generator 34 passes through a lens 35 and inputs to the light separation system 40.

The light separation system 40 is a system that separates light emitted from the light irradiation system 30 into red light, green light and blue light. As shown in FIG. 1, a diachronic mirror 41 reflects red light and makes green and blue light pass through. The red light reflected by the diachronic mirror 41 is reflected by a reflector 42, passes through the field lens 43 and reaches the liquid crystal device 10R. On the other hand, a diachronic mirror 44 reflects green light among light passed through the diachronic mirror 41 and makes blue light pass through. The green light reflected by the diachronic mirror 44 passes through the field lens 45 and reaches the liquid crystal device 10G. Further, the blue light passed through the diachronic mirror 44 passes through a relay lens 46 and reaches the liquid crystal device 10B. Namely, the blue light passes through the input side lens 461, is reflected by a reflector 462, then passes through a relay lens 463, is further reflected by the reflector 464, passes through an output side lens 465 and reaches the liquid crystal device 10B.

Each of liquid crystal devices 10 includes a plurality of pixels arranged in matrix and modulates input light every pixel corresponding to image data input from outside, emitting the modulated light. Light output from three liquid crystal devices 10 is synthesized by a diachronic prism 51 and input to the projection lens 52. The projection lens 52 projects light output from the diachronic prism 51 onto a planer screen S.

Figure 2:
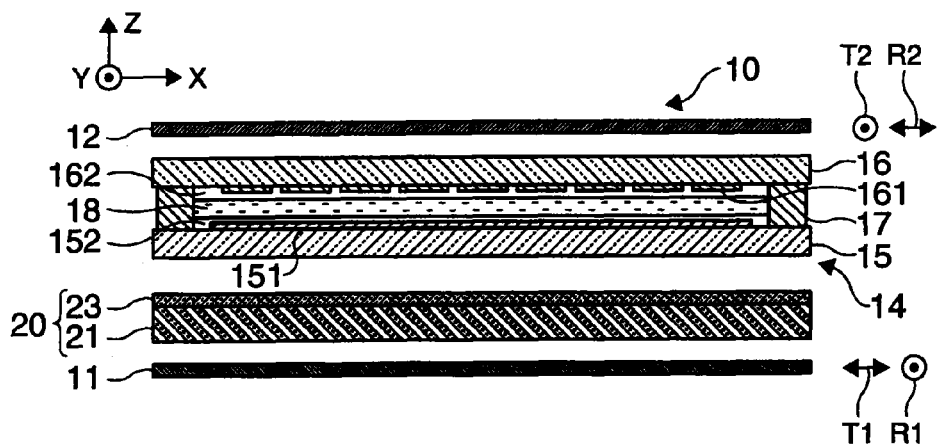
FIG. 2 is a cross section showing the projection apparatus according to a first embodiment.

FIG. 2 is a cross section showing one of liquid crystal devices (10R, 10G and 10B.) In this figure, the upper stream side of the optical path from the light irradiation system 30 to the projection lens 52 (the light irradiation system 30 side) is defined as a lower side and the lower stream side of the optical path (the projection lens side 52) is defined as the upper side.

Here, in FIG. 2, components are separately placed each other for the convenience, but actually attached with adhesives without spacing.

As shown in the figure, the liquid crystal device 10 includes a first polarization plate 11 and a second polarization plate 12, which are oppositely placed each other. The first polarization plate 11 is placed near the light irradiation system side 30 far from second polarization plate 12. Each of the first polarization plate 11 and the second polarization plate 12 is a plate-like member that selectively makes light, which oscillates to the direction in parallel with the transparent axis T (T1 and T2), pass through. The transparent axis T1 of the first polarization plate 11 is orthogonal to the transparent axis T2 of the second polarization plate 12. As shown in FIG. 2, the direction of the transparent axis T1 of the first polarization plate 11 (namely the absorption axis R2 of the second polarization plate 12) is defined as "the direction X" and the direction of the transparent axis T2 of the second polarization plate 12 (namely the absorption axis R1 of the first polarization plate 11) is defined as "the direction Y" hereafter. Further, the direction vertical to the XY plane (namely, the optical axis of the liquid crystal panel 14) is defined as "the direction Z".

The liquid crystal panel 14 is placed between the first polarization plate 11 and the second polarization plate 12. Therefore, the first polarization plate 11 is placed on the optical path from the light irradiation system 30 to the liquid crystal panel 14 and the second polarization plate 12 is placed on the optical path from the liquid crystal panel 14 to the projection lenses 52. The liquid crystal panel 14 encapsulates a vertical alignment mode liquid crystal 18 between a first substrate 15 and a second substrate 16 which are attached and oppositely faced together via a seal member 17. In the embodiment, the liquid crystal panel 14 is a transparent type display which makes light, which inputs from the light irradiation system 30 to the first substrate 15 via the light separation system 40, pass through the liquid crystal 18 and the second substrate 16, and output to the diachronic prism 51.

On the surface of the first substrate 15 facing the liquid crystal 18, an opposite electrode 151 spreads in the entire area and an alignment film 152 covering over the opposite electrode 151 are formed. On the other hand, on the surface of the second substrate 16 facing the liquid crystal 18, a plurality of pixel electrodes 161, which are arranged in a matrix toward the directions X and Y and faces the opposite electrode 151, and an alignment film 162 covering over the pixel electrodes 161 are formed. Under these structures, a pixel is provided with each of the pixel electrodes 161, the opposite electrode 151 facing them and the liquid crystal 18 sandwiched by both of them. The pixel electrodes 161 and the opposite electrode 151 are made of a light-transparent conductive material such as indium tin oxide (ITO.) Further, the alignment films 152 and 162 are made of an inorganic material such as $SiO_x$.

Figure 3:
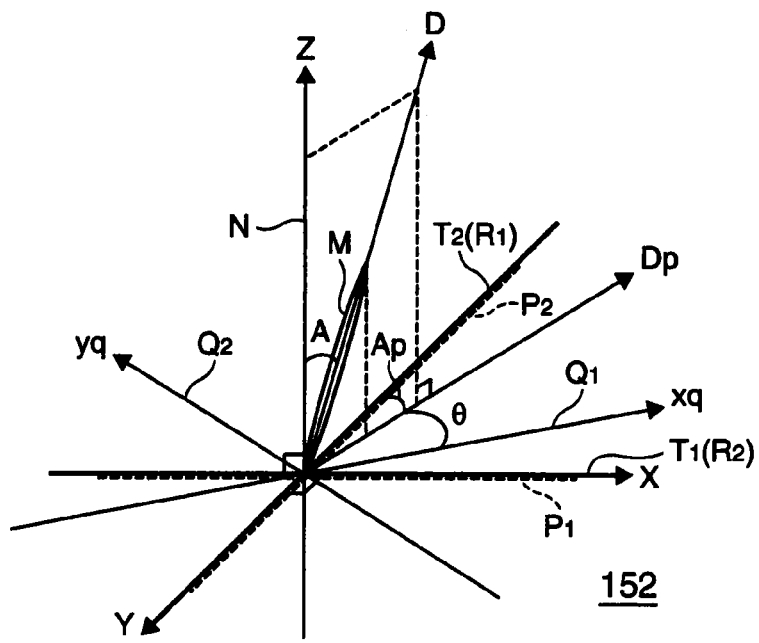
FIG. 3 is a perspective view showing the direction of aligning a liquid crystal molecule at the non-voltage state.
Figure 4:
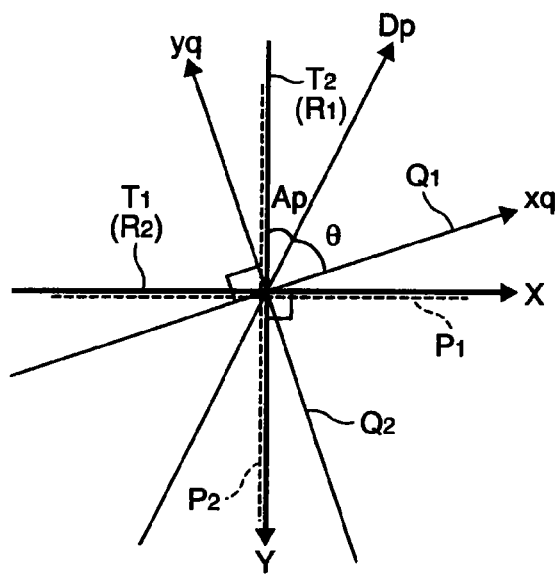
FIG. 4 is a plane view illustrating components shown in FIG. 4 from the direction that is vertical to the first substrate.

FIG. 3 is a diagram showing the direction of aligning a molecule M of the liquid crystal 18 placed on the surface of the alignment film 152 when no voltage is applied (namely the potential of the pixel electrode 162 is equal to the potential of the opposite electrode 151.) FIG. 4 is a plane view of elements shown in FIG. 3 from the direction Z. As shown in FIGS. 3 and 4, the alignment film 152 makes the liquid crystal molecule M at the non-voltage state align to the direction D in which the longer axis of a liquid crystal molecule located on the surface of the film is tilted by the angle A toward the vertical direction N(Z direction) of the XY plane. This angle A is $0° \leq A \leq 10°$ (5° in the embodiment.) Thus, by tilting the liquid crystal molecule M, it is possible to certainly regulate the direction of turning over the liquid crystal molecule when voltage is applied to the pixel electrode 162 and the opposite electrode 151. Then, this regulating effectively avoids discrenation due to disturbance of alignment of the molecule M.

On the other hand, the direction Dp of the longer axis when the liquid crystal molecule M at the no-voltage state is normally projected on the surface of the first substrate 15, has the angle Ap clockwise to the direction Y in which the transparent axis T2 of the second polarizing plate 12 (or the absorption axis R of the first polarizing plate 11) is extended This angle Ap is determined corresponding to the retardation Δnd (Δn: refractive anisotropy, d: the thickness of the liquid crystal 18 in the direction Z.) In order to satisfy the above condition, the alignment film 152 aligning the liquid crystal molecule M is formed by evaporating an inorganic material from the direction which has a predetermined angle (50°, for example) toward the vertical line N of the first substrate 15, for example. Here, the posture of the liquid crystal molecule M located adjacent to the surface of the alignment film 152 was explained. Further, the liquid crystal molecule M adjacent to the surface of the alignment film 162 is aligned in the same manner.

Thus, in the structure of tilting the liquid crystal molecule M toward the direction Z by the angle A, the liquid crystal 18 shows the birefringence corresponding to the angle A. Then, when light emitted from the first polarization plate 11 is directly input to the liquid crystal panel 14 and light emitted from the liquid crystal panel 14 is directly input to the second polarization plate 12 (namely there is no member placed between the liquid crystal panel 14 and the first polarization plate 11 or the second polarization plate 12), light passing through the liquid crystal 18 receives its birefringence, narrowing a view angle (the range of receiving a sufficient contrast) as the result. In order to overcome this issue, as shown in FIG. 2, an optical-compensation plate 20 for compensating the birefringence of the liquid crystal panel 18 is placed between the first polarization plate 11 and the liquid crystal panel 14 in the embodiment.

The optical-compensation plate 20 comprises a plate-like base 21 having light transparency and a film-like retardation plate 23 formed on the surface of the plate like base 21. In the embodiment, the optical-compensation plate 20 is placed so that the retardation plate 23 is placed facing the liquid crystal panel 14 and the plate like base 21 faces the first polarization plate 11 (namely, the plate like base 21 is placed on the opposite side of the liquid crystal panel 14 with encapsulating the retardation plate 23.) This base 21 is a member formed by arranging a crystal such as sapphire in plate, for example. This kind of crystal has high thermal conductivity (over 40 J/s·m·°C., for example.) On the other hand, it is easy to generate heat in a liquid crystal device 10 installed in a projection apparatus D of the embodiment comparing to a liquid crystal device (installed in a liquid crystal TV, for example) in which a viewer directly recognizes an image since strong intensity light is irradiated. In this embodiment, heat generated in the retardation plate 23 is transferred to the plate like base 21 and irradiated from it since the retardation plate 23 is formed on the surface of the base having high thermal conductivity. Hence, the embodiment has advantage that the change of optical characteristics of the liquid crystal device 10 due to thermal deformation of the retardation plate 23 can be constrained.

Figure 5:
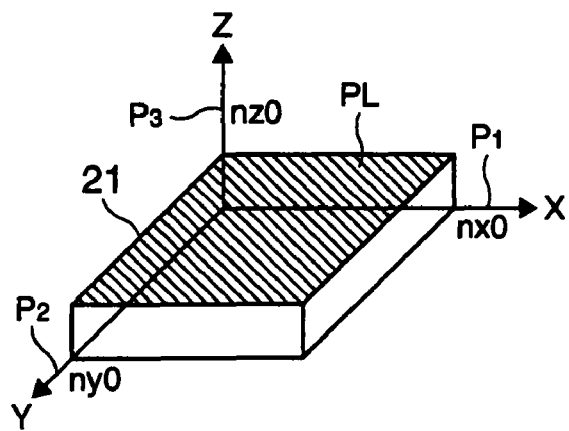
FIG. 5 is a diagram showing basic optical characteristics of the optical-compensation plate.

Here, the plate like base 21 made of a material such as sapphire showing two-axes birefringence due to structural anisotropy of the crystal. Namely, as shown in FIG. 5, the main refractive index nx0 in the direction of the first axis P1, which is in parallel to the plate surface (main surface) PL of the plate like base 21, the main refractive index ny0 in the direction of the second axis P2, which is in orthogonal to the first axis P1 in a plane which is parallel with the plate surface PL, and the main refractive index nz0 in the direction of the third axis P3, which is vertical to the plate surface PL have the following relationship: nx0>ny0>nz0.

Thus, the plate like base 21 has the birefringence in the direction of it's plane(nx0>ny0), in which it is possible that light passed through the first polarization plate 11 will be elliptical-polarization light due to the effect of birefringence of this base 21. In the embodiment, in order to reduce the birefringence in the direction of the surface of the plate like base 21, as shown in FIG. 3 and FIG. 5, the direction of the first axis P1 of the plate like base 21 coincides with the transparent axis T1 of the first polarization plate 11 (the absorption axis R2 of the second polarization plate 12.) Further, the direction of the second axis P2 of the plate like base 21 coincides with the absorption axis R1 of the first polarization plate 11 (the transparent axis T1 of the second polarization plate 12.) The optical-compensation plate 20 is placed so that each main axis (electrical main axis) in the direction of the plane of the plate like base 21 satisfies the above conditions. Hence, the linear polarization light emitted from the first polarization plate 11 inputs to the plate like base 21 of which oscillation direction is a delay axis or a fast axis thereby. Therefore, the light emitted from the first polarization plate 11 can be input to the retardation plate 23 without greatly changing its characteristics (namely, with holding the linear polarization.)

On the other hand, the retardation plate 23 is a membrane showing one-axis birefringence. Namely, as shown in FIG. 3 and FIG. 4, the main refractive index nx1 in the direction xq of the first axis Q1, which is in parallel with the plane of the retardation plate 23, is larger than the main refractive index ny1 in the direction yq of the second axis Q2, which is orthogonal to the first axis Q1 in the plane which is parallel with the retardation plate 23 (nx1>ny1.) Further, as shown in FIG. 3 and FIG. 4, the retardation plate 23 is formed on the plate like base 21 so that the first axis Q1 has an angle θ clockwise toward the direction Dp (namely the longer axis direction when the liquid crystal molecule M is normally projected on the XY plane.) This angle θ satisfies 40°=θ≦50.°

The refractive indexes of the plate like base 21 (nx0, ny0 and nz0) and refractive indexes of the retardation plate 23 (nx1 and ny1) are selected so as to satisfy the condition nx>ny>nz, where nx is the maximum value (main refractive index) in a plane which is in parallel with the liquid crystal panel 14, ny is the refractive index that is orthogonal to the refractive index nx in the same plane, nz is the refractive index in the direction that is vertical to the liquid crystal panel 14, when viewing the optical-compensation plate 20 as a whole. Namely, the optical-compensation plate 20 having two-axes birefringence is applied. Here, the refractive index nz in the direction that is vertical to the liquid crystal panel 14, is smaller than other refractive indexes nx and xz in the other directions. Thus, narrowing viewing angle due to the tilt A of the liquid crystal molecule M toward the direction Z can be constrained thereby. Accordingly, in the present embodiment, the liquid crystal molecule M is tilted by the angle A, avoiding the discrenation due to the disturbance of the alignment as well as constraining lowering of the contrast ratio due to the angle A. More specifically, in order to realize the improvement of a contrast ratio and enlarging a viewing angle in addition to compensation of the birefringence of the liquid crystal 18, the refractive indexes (nx, ny and nz) are selected so as to the following conditions when viewing the optical compensation panel 20 as a whole.

First, according to a simulation or an experiment done by the inventor, when the retardation value within a plane of the optical compensation panel 20 is within the range from 20 nm to 180 nm, higher contrast ratio can be attained over a wider viewing angle by compensating the birefringence of the LC18 well. Accordingly, the optical-compensation plate 20 is formed so that the characteristics and configurations of the plate like base 21 and the retardation plate 23 are selected so as to satisfy the following condition regarding refractive indexes nx and ny;

20 [nm]<(nx−ny)×d0<180 [nm], where d0 is the thickness of the optical-compensation plate 20 (the sum of thickness of the plate like base 21 and the retardation plate 23.)

Figure 6:
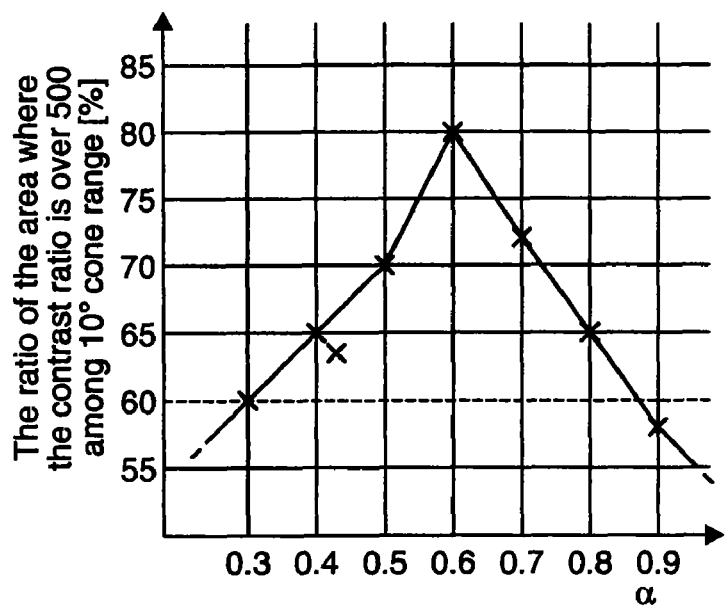
FIG. 6 is a graph showing the change of the parameter Z.

Further, the inventor measured the ratio of an area where a contrast ratio is over 500 among the circular cone area (called as 10° cone range hereafter), which is ±5° toward the direction Z vertical to the liquid crystal panel 14, by arbitrarily changing the parameter Z with respect to refractive indexes (nx,y and nz) of the optical-compensation plate 20. This parameter Z is defined as Z={(nx+ny)/2−nz}×d0. This measurement was implemented by measuring amounts of light emitted from the second substrate 16 when the light source is placed on the side of the first substrate 15 of the liquid crystal panel 14. FIG. 6 is a graph of the measurement result. The horizontal axis shows the ratio of the parameter Z to retardation Δnd, α(α=Z/Δnd.)

FIG. 6 shows that the contrast ratio is over 500 in more than 60% of the 10° cone range if the parameter Z is the range from 0% (α=0.3) to 80% (α=0.8) of the retardation Δnd. On the other hand, when the contrast ratio is over 500 in more than 60% of the 10° cone range, the contrast ratio of the image that is actually projected on the screen S is over 1000, which is actually preferable. Accordingly, in the embodiment, it is preferable that the parameter Z showing the characteristics of the optical-compensation plate 20 is Δnd×0.3<Z<Δnd×0.8, more specifically Δnd×0.5<Z<Δnd×0.7.

As already explained, the embodiment can maintain the high contrast ratio over a wide viewing angle with constraining discrenation. Further, in the embodiment, the plate like base 21 faces the first polarization plate 11 and the optical-compensation plate 20 is placed so that the retardation plate 23 faces the liquid crystal panel 14. It is advantageous in this structure that the birefringence of the liquid crystal 18 can be accurately compensated by this structure, comparing to a structure in which the positional relationship between the plate like base 21 and the retardation plate 23 is inverted. Namely, in the structure in which the plate like base 21 faces the liquid crystal panel 14 and the optical-compensation plate 20 is placed so that the retardation plate 23 faces the first polarization plate 11, it is possible that the light emitted from the retardation plate 23 and reaching the liquid crystal panel 14, receives the birefringence of the plate like base 21 by passing through the plate like base 21. Thus, when the light receiving the birefringence of the plate like base 21 is input to the liquid crystal panel 14, this effect cannot completely be compensated even if the retardation plate 23 is formed so as to compensate the birefringence of the liquid crystal 18. On the other hand, in the embodiment, the first axis P1 and the second axis P2 of the plate like base 21 has the same direction of the transparent axis T1 and the absorption axis R1 of the first polarization plate 11. In addition to this structure, the plate like base 21 is placed near the first polarization plate 11 far from the retardation plate 23, accurately giving a characteristic of compensating the birefringence of the liquid crystal 18 to the polarization light emitted from the first polarization plate 11 and passed through the plate like base 21.

Second Embodiment

Next, a second embodiment of the invention is explained. Here, the same components in the first embodiment of the invention have the same reference numerals and their explanation is omitted.

Figure 7:
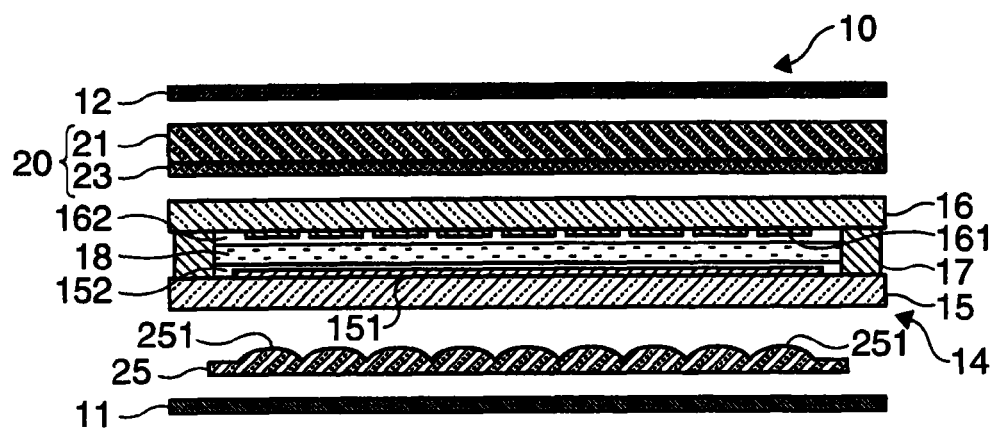
FIG. 7 is a cross section showing a liquid crystal device according to a second embodiment of the invention.

FIG. 7 is a cross section of the structure of the liquid crystal device of the present embodiment. As shown in the figure, a micro lens array 25 is arranged between the liquid crystal panel 14 and the first polarization plate 11. The micro lens array 25 is a plate-like transparent member in which convex lenses 251 corresponds to pixels arranged in a matrix. The light emitted from the first polarization plate 11 is condensed by each lens 251 of the micro lens array 25 and the condensed light is input to the liquid crystal 18 via the opposite electrode 151. Therefore, it is possible to display an image that has full of brightness with improving light efficiency comparing to a structure without the micro lens array 25 being placed. Here, in FIG. 7, the liquid crystal 14 is separately placed from the micro lens array 25. But, in the actual device, the micro lens array 25 is attached to the first substrate 15 of the liquid crystal panel 14 with an adhesive, which has the same refractive index of the lens array 25. Further, a micro lens array in which concave lenses are arranged in a plane may be used instead of the convex lens 251.

On the other hand, the optical-compensation plate 20 for compensating the birefringence of the liquid crystal panel 14 is placed between the liquid crystal panel 14 and the second polarization plate 12 so that the retardation plate 23 faces the liquid crystal panel 14 and the plate like base 21 faces the second polarization plate 12 (namely the plate like base 21 is placed on the opposite side of the liquid crystal panel 14 with encapsulating the retardation plate 23.) The conditions and other optical characteristics, which the optical-compensation plate 20 satisfies, is the same of the first embodiment. For example, the first axis P1 of the plate like base 21 has the direction Y of transparent axis T2 of the second polarization axis 12 and the second axis P2 of the plate like base 21 has the direction X of the absorption axis R2 of the second polarization plate 12. The present embodiment shows the same effect and function of the first embodiment.

Here, the light passed through the micro lens array 25 receives the optical characteristic of the convex lens 251. Hence, in a structure in which the optical-compensation plate 20 is placed between the micro lens array 25 and the first polarization plate 11, it is possible that the birefringence of the liquid crystal 18 cannot be sufficiently compensated because of changing the characteristics of the light input to the liquid crystal panel 14 due to passing through the micro lens array 25, even if the characteristics of the plate like base 21 and the retardation plate 23 are determined so as to give a characteristic for offsetting the birefringence of the liquid crystal 18 to the light passing through the optical-compensation plate 20. On the other hand, in the embodiment, the birefringence of the liquid crystal 18 can be further certainly constrained since the optical-compensation plate 20 is placed between the second polarization plate 12 and the liquid crystal panel 14.

MODIFICATION

Various modifications can be applied to the above embodiments. Concrete examples of modifications are explained hereafter. But, the following examples may be arbitrarily combined each other.

Modification 1

In the above embodiments, the retardation plate 23 faces the liquid crystal panel 14. On the other hand, the plate like base 21 may face the liquid crystal panel 14 and the retardation plate 23 may face the first polarization plate 11 (the second polarization plate 12 in the second embodiment.) Further, in the above embodiments, the optical compensating plate 20 is placed only on one side of the liquid crystal panel 14. But, two optical compensating plates 20 (the directions of them are not cared) may be placed between both the liquid crystal panel 14 and the first polarization plate 11, and the liquid crystal panel 14 and the second polarization plate12.

Modification 2

In the above embodiments, the first substrate 15 is placed on the side of the light source 31 and the second substrate 16 is placed on the side of the projection lens 52. On the other hand, the first substrate 15 having the opposite electrode 151 may be placed on the side of the projection lens 52 to the liquid crystal 18 and face the second polarization plate 12. Further, the second substrate 16 having the pixel electrode 161 may be placed on the side of the light source 31 to the liquid crystal 18 and face the first polarization plate 11.

Modification 3

In the above embodiments, the retardation plate 23 has one-axis birefringence. But, the retardation plate 23 may have two-axes birefringence. Namely, the main refractive indexes nx1 and ny1 of the retardation plate 23 which are orthogonal each other in a plane in parallel with the liquid crystal panel 14, and the main refractive index nz1 of the retardation plate 23 which is vertical to the liquid crystal panel 14 may have the following relationship; nx1>ny1>nz1. Namely, the optical-compensation plate 20 is a plate-like member in which the retardation plate 23 showing the one-axis or two-axes birefringence is attached on the surface of the plate like base 21 showing two-axes birefringence. Further, when viewing the optical-compensation plate 20 including the plate like base 21 and the retardation plate 23 as a whole, it is sufficient that the main refractive index nz1 of which direction is vertical to the liquid crystal panel 14 is smaller than nx1 (the maximum value of the liquid crystal plane) of which direction is in parallel with the liquid crystal panel 14 and ny1 which is orthogonal to nx1.

Modification 4

In the above embodiments, the liquid crystal device 10 was applied to a projection apparatus. But, the display of the present invention is not limited to this. For example, as a display, it can be applied to various electronic apparatuses such as personal computers and mobile phones. As electronic apparatus to which the display of the invention is applied, a personal digital assistance (PDA), a digital still camera, a TV, a video camera, a navigation device for an automobile, a pager, an electronic note, electronic paper, electronic calculator, a word processor, a work station, a TV phone, a POS terminal, a printer, a scanner, a duplicator, a video player, a device having a touch panel and the like are cited. In particular, a display in which the plate like base 21 is made by sapphire having high thermal conductivity and a display in which the alignment film 152 and 162 are made by an inorganic material having high heat resistance, are preferable for a projection apparatus in which heat is easily generated from any parts due to high intensity of light irradiation comparing to a liquid crystal device for direct viewing.

What is claimed is:

1. A liquid crystal device comprising:
a first polarization plate having a first transparent axis;
a second polarization plate having a second transparent axis, a direction of the second transparent axis intersecting to a direction of the first transparent axis;
an optical-compensation plate disposed between the first polarization plate and the second polarization plate, the optical-compensation plate including a plate-like base and a retardation plate, the plate-like base being opposite to the second polarization plate and having a delay axis within a plane that is in parallel with a plate side of the plate-like base, the delay axis being in parallel with the second transparent axis, the optical-compensation plate having a first surface that has a first axis and a second axis, the first axis and the second axis being in parallel with the first surface, the first axis intersecting to the second axis, the optical-compensation plate having a third axis, the third axis intersecting to the first surface, the optical-compensation plate having a first refractive index in a direction of the first axis, the optical-compensation plate having a second refractive index in a direction of the second axis, the optical-compensation plate having a third refractive index in a direction of the third axis, the first refractive index being larger than the second refractive index, the second refractive index being larger than the third refractive index, a direction of the third axis intersecting to a direction of the first transparent axis, a direction of the third axis intersecting to a direction of the second transparent axis;
a first substrate disposed between the optical-compensation plate and the second polarization plate;
a liquid crystal disposed between the first substrate and the second polarization plate; and
a second substrate disposed between the liquid crystal and the second polarization plate.

2. An electronic apparatus including a liquid crystal device according to claim 1.

3. The liquid crystal device according to claim 1, the plate-like base formed by arranging a crystal having a thermal conductivity of over 40 J/s·m·° C., the plate-like base being arranged directly adjacent to the retardation plate.

4. A liquid crystal device comprising:
a first polarization plate having a first transparent axis;
a second polarization plate having a second transparent axis, a direction of the second transparent axis intersecting to a direction of the first transparent axis;
an optical-compensation plate disposed between the first polarization plate and the second polarization plate, the optical-compensation plate including a plate-like base and a retardation plate, the plate-like base formed by arranging a crystal having a thermal conductivity of over 40 J/s·m·° C., the plate-like base being arranged directly adjacent to the retardation plate, the optical-compensation plate having a first surface that has a first axis and a second axis, the first axis and the second axis being in parallel with the first surface, the first axis intersecting to the second axis, the optical-compensation plate having a third axis, the third axis intersecting to the first surface, the optical-compensation plate having a first refractive index in a direction of the first axis, the optical-compensation plate having a second refractive index in a direction of the second axis, the optical-compensation plate having a third refractive index in a direction of the third axis, the first refractive index being larger than the second refractive index, the second refractive index being larger than the third refractive index, a direction of the third axis intersecting to a direction of the first transparent axis, a direction of the third axis intersecting to a direction of the second transparent axis;

a first substrate disposed between the optical-compensation plate and the second polarization plate;

a liquid crystal disposed between the first substrate and the second polarization plate; and a second substrate disposed between the liquid crystal and the second polarization plate.

* * * * *